Oct. 14, 1941.  W. R. DEWEY ET AL  2,258,745
DUCT LEADER
Filed April 22, 1939

MIXTURE OF ASBESTOS AND RUBBER

Inventors:
William R. Dewey,
Ray E. Spokes
By: Belt, Wallace & Cannon
Attorneys.

UNITED STATES PATENT OFFICE 2,258,745

DUCT LEADER

William R. Dewey, Detroit, and Ray E. Spokes, Ann Arbor, Mich., assignors to The American Brake Shoe and Foundry Company, New York, N. Y., a corporation of Delaware Application April 22, 1939, Serial No. 269,382

1 Claim. (Cl. 174—83)

This invention relates to duct leaders and the method of making the same and more specifically to the novel method of producing leaders through which electric power, telephone and like cables are led into manholes, buildings and the like.

It is well-known that underground electric power cables and the like creep or slide due, for example, to the expansion and contraction thereof by reason of temperature changes induced therein by reason of variations in the current load on the conductors therein, and it has been observed that this induces considerable erosion and wear upon the cables particularly at the points where they are led through openings in manhole walls and the like. Erosion and wear at these points is particularly great due to the fact that the cables usually bend adjacent such openings and as they creep or slide back and forth the angularly curved or bent portions thereof ride over the edges of the openings and are thereby torn or otherwise damaged.

Accordingly, an object of the present invention is to afford a smooth surface over which a cable or the like may be led into or from a manhole or elsewhere and across which the cable may creep or slide with a minimum of erosion and wear, and a related object is to prevent the cable or the like from contacting the edges of an opening through which it is led.

Still other objects are to so form a lining for an opening in a manhole or the like that a cable or the like passed therethrough will be prevented from engaging the edges of the opening as by providing a flange or curved lip on the lining that will overlie an exposed edge of the opening in which the lining or leader is installed and which will afford a continuation of the smooth surface the lining presents to a cable or the like passed therethrough; to afford innate resiliency in the lining or leader; to so construct and arrange the leader that the innate resiliency thereof will tend to prevent displacement thereof from an opening in which it is installed; to insure against displacement of the lining from such an opening as by roughening or knurling the surface of the lining faced toward the wall of the opening; and to also so construct and arrange the lining that installation thereof into an opening or the like will be facilitated.

While in most instances it is not essential that the lining or leader of this invention be fire-resistant, there may be instances where this will be desirable and to this end yet another object is to impart fire-resistant properties to the leader.

Further important objects are to provide a novel composition from which a lining or leader possessing the aforesaid and kindred attributes may be produced and to produce such a lining or leader from such a composition in a novel manner.

Other and further objects of the present invention will be apparent from the following description and claim and are illustrated in the accompanying drawing which, by way of illustration, shows a preferred embodiment and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claim.

Figure 1:
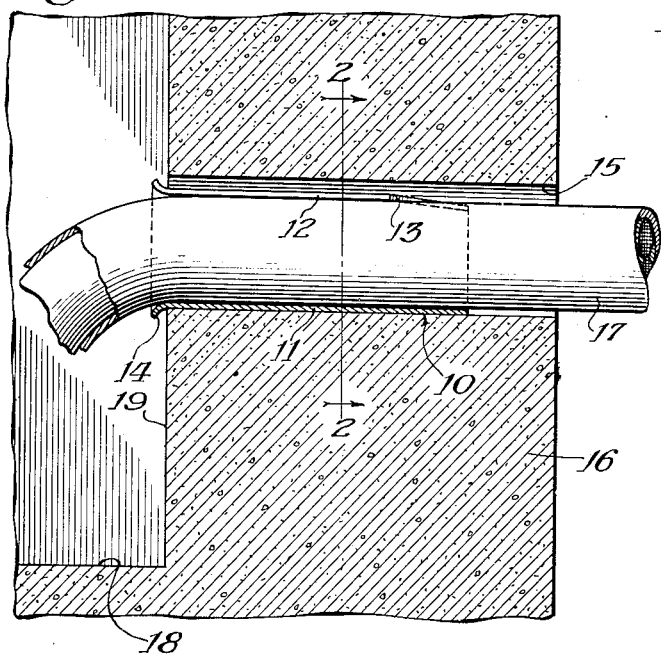
Fig. 1 is a view, partly in section and partly in elevation, showing a typical embodiment of my novel duct leader in position of use.
Figure 2:
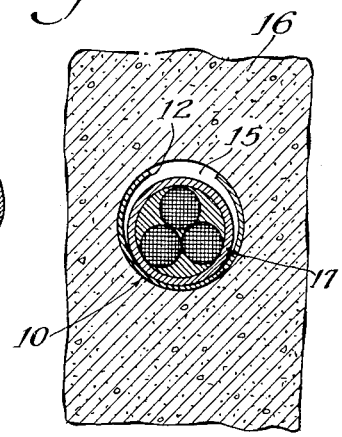
Fig. 2 is a sectional view on line 2—2 on Fig. 1.
Figure 3:
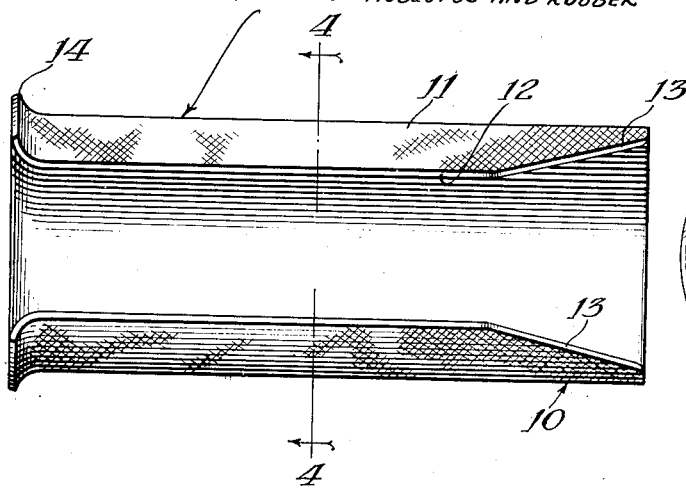
Fig. 3 is a plan view of the embodiment of the invention shown in Fig. 1.
Figure 4:
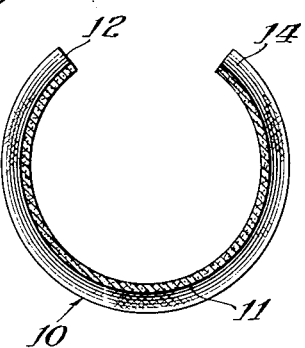
Fig. 4 is a transverse sectional view on line 4—4 on Fig. 3.

In the typical embodiment of the present invention illustrated in the accompanying drawing, a duct leader generally indicated by 10 is shown as installed in an opening 15 in the wall 16 of a manhole or the like, the opening 15 affording access to the interior 18 of such manhole or the like.

The leader 10 includes a body 11 generally tubular in form and circular in cross section. An outwardly extending flange or rounded lip 14 is provided at one end of the body which has an axially extending slot formed therein that extends end to end of the body and which is preferably enlarged as by being chamfered as indicated at 13 at the end of the body opposite the lip 14. The body 11 is preferably formed from a novel composition and in a novel manner, both explained more fully hereinafter, and is innately resilient, and for this reason when the body 11 is compressed to reduce the width of the slot 12 therein and then inserted into an opening as 15, it will, when released, expand into engagement with the wall of the opening, the chamfered portions 13 facilitating such reduction of the width of the slot and insertion of the leader into the opening. The surface of the leader thus presented to the wall is preferably knurled or otherwise roughened and this, coupled with the innate resiliency of the leader, prevents undesired displacement thereof from the opening.

It will be understood that leaders of various cross-sectional areas will be provided to accommodate openings of various sizes and that a leader will be chosen that normally is of a diameter slightly greater than the diameter of the opening into which it is to be installed so that when installed the leader will be under tension. Likewise, leaders of various lengths will be provided so that when a leader is installed in an opening and an electric power cable or the like is passed through the leader the cable will be supported on the smooth inner surface of the leader and out of engagement with the wall of the opening, the outwardly extending flange of the rounded lip 14 overlying the edge of one end of the opening to further insure against engagement of the cable with the wall of the opening, and such flange will be provided to be positioned in the opening at the end thereof where the cable will bend. Where the opening 15 is provided in a manhole wall, the cable usually passes to the opening in a straight line but is bent toward terminals or the like in the manhole immediately after passage thereof through the manhole wall, and the rounded lip 14 therefore presents a continuous smooth inner surface of the lining to the cable whereby erosion and wear of the cable is reduced to a minimum, especially at the bent portion therein, which will tend to creep or slide over the rounded lip 14 by reason of the temperature changes in the cable such as those which are induced by variations in the current load carried by conductors in the cable.

A suitable composition from which a leader possessing the above described and related characteristics may be produced is substantially as follows, all parts being indicated by weight:

*Formula No. 1*

| | Parts |
|---|---|
| Rubber cement (40% rubber and balance coal tar solvent) | 32.5 |
| Asbestos (Canadian short fiber) | 30.0 |
| Asbestos (Canadian long fiber) | 25.0 |
| Thermatomic carbon black | 2.5 |
| Sulphur | 2.75 |
| Zinc oxide | 5.00 |
| Litharge | 4.00 |
| Stearic acid | 0.26 |
| Pine tar | 0.26 |
| Rubber plasticizer (75% sulfonated petroleum product—commercially identified as "Sulfor A" and 25% normal butyl alcohol) | 0.26 |
| Accelerators (finely ground elementary selenium) | 0.26 |

The rubber cement content specified in the foregoing formula should not be materially decreased for so to do may not result in the production of a satisfactory product. The rubber cement content, however, may be increased somewhat and yet afford a suitable composition. Moreover, for the same reason the specified asbestos content should not be materially decreased and also it should not be increased without a corresponding increase in the rubber cement content for it has been found that the ratio of rubber to asbestos in the composition is somewhat critical for variations in this ratio are apt to cause difficulties in the practice of the novel hereinafter described method for making the duct leader of this invention. For example, the addition of five parts of asbestos above that specified in the foregoing formula without a corresponding increase in the rubber cement content may result in failure of the sheet material produced from the composition to roll properly during the forming operation that will be described presently.

Moreover, it is desirable to use as much short fiber asbestos as possible for reasons of economy, it being understood that the long fiber asbestos is employed to impart the desired degree of strength. The ratio between these two different types of asbestos that are specified in the foregoing formula is one that has been found to balance these two factors satisfactorily.

What has been said with respect to the ratio of short to long fiber asbestos applies with equal force to the thermatomic carbon black for material variations in this content may also have a marked effect upon the strength and other properties of the resulting product. The relative proportions of the other ingredients specified in the foregoing formula and which are added to facilitate cure of the rubber may be altered, as will be understood in the art, provided the conditions as to time and temperature under which the rubber is cured, and which are explained hereinafter, are varied accordingly.

In some instances it may be desirable to impart fire-resistant properties to the duct leaders, and a suitable composition from which a leader possessing this and the other described and related characteristics may be produced is substantially as follows, all parts being indicated by weight:

*Formula No. 2*

| | Parts |
|---|---|
| Synthetic rubber (Type G Duprene) | 13.00 |
| Benzol, or equivalent coal tar solvent | 19.50 |
| Asbestos (Canadian short fiber) | 35.00 |
| Asbestos (Canadian long fiber) | 25.00 |
| Thermatomic carbon black | 2.50 |
| Clay (Dixie) | 10.00 |
| Calcined magnesia | 0.60 |
| Zinc oxide | 0.75 |
| Antioxidant (phenyl-beta naphthyiamine) | 0.03 |

The synthetic rubber is dissolved in the solvent specified in the foregoing formula to provide a rubber cement which, for the purpose of compounding the composition, is equivalent to that specified in Formula No. 1, and what has been said hereinabove with respect to the ratio between the rubber cement and the asbestos, in so far as Formula No. 1 is concerned, applies with equal force in so far as Formula No. 2 is concerned. Likewise, what has been said with respect to fillers, such as thermatomic carbon black, in connection with Formula No. 1, applies with equal force to this substance and the other fillers, such as the clay, specified in Formula No. 2. Moreover, what has been said relative to ingredients included in Formula No. 1 to facilitate cure of the rubber also applies in so far as such ingredients included in Formula No. 2 are concerned.

A leader produced from the composition of either Formula No. 1 or Formula No. 2, or an equivalent composition, will possess the characteristics described above especially when produced in the following novel manner.

The preferred method for producing duct leaders embodying the above described characteristics, whether produced from a composition in accordance with Formula No. 1 or Formula No. 2 or an equivalent composition, includes first preparing the rubber cement which, of course, entails dissolving the rubber of Formula No. 1 or the synthetic resin of Formula No. 2 in the solvent and thereafter introducing the other ingredients while agitating the entire mixture in a suitable mixture, it being preferable that the asbestos either be mixed prior to introduction thereof into the mixture or that both the long and short fiber asbestos be added to the mixture at substantially the same time, and it has been found that best results are realized when the asbestos is the last of the specified ingredients to be added to the mixture. An ordinary dough mixture is suitable for the purpose and preferably the mixing operation is continued until the asbestos is thoroughly coated.

The mixture is then removed from the mixer and introduced into a suitable rolling mill where it is rolled into strips of a width sufficient to enable the length of the duct leaders to be cut therefrom, and during passage of the mixture through the rolling machine in which this operation is performed, what is to be the outer surface of duct leaders cut from the strips 20 produced, is knurled or otherwise roughened, while what is to be the inner surface of such leaders or the like is rolled smooth.

Strips so produced are placed on trays or other suitable supports and are introduced into a drying room or cabinet and are preferably subjected to a temperature of about 150° F. for a period of from about eighteen to about twenty-four hours to remove the solvent, the particular time required for removing the solvent depending upon the time that has elapsed between the mixing of the ingredients and the introduction thereof into the drying room, cabinet or the like. Care should be taken in this operation to avoid curing the rubber.

After the solvent has been removed the strips are divided into sections or blanks of a size proper to form the finished leader and such blanking out operation may be effected in any desired manner. After the blanks have been struck from the sheets they are passed through a forming roll to impart approximately the desired curvature or radius thereto. The rolled blanks are then placed in a preforming press and the rounded lips as 14 are formed thereon by the pressure exerted in the press and the dies or the like in which the blanks are placed when installed in the press. The blanks as thus formed, are then placed in finishing molds and subjected to pressure, without heat, and the result of this operation is the production of leaders such as are illustrated in the accompanying drawing and which is then ready for the final cure.

It has been found to be advantageous to place the leaders removed from the finishing molds on heat-resistant tubes of an outside diameter substantially equal to the desired inside diameter of the leaders, and to facilitate handling during the final cure the tubes are preferably of such a length that two or three leaders may be mounted on each tube. It has also been found to be advantageous to employ garter springs or the like to retain the leaders on the tubes during the final cure thereof and the handling incident to such final cure.

The heat resistant tubes having the leaders fast thereon as just described are mounted on suitable racks and are then passed into a hot air oven to have the final cure of the leaders effected. Preferably the cure is brought about by first subjecting the leaders to a temperature of about 175° F. for a period of approximately one hour; then to a temperature of about 250° F. for a period of approximately one hour; then to a temperature of 275° F. for a period of approximately two hours; and finally to a temperature of about 300° F. for a period of approximately one and one-half hours.

When the final cure, such as the foregoing, has been completed the leaders may be passed through finishing operations to be freed of fins and the like and the chamfered portions 13 may be conveniently formed at this time.

It will be manifest from the foregoing description that we have enabled duct leaders and the like to be produced which will embody the attributes set forth hereinabove as objects of this invention and kindred attributes and advantages and that such novel leaders and the like are produced from novel compositions in a novel manner. It is to be understood however that, while we have set forth preferred embodiments of our invention, we are not to be limited to the precise details set forth for these are susceptible of variation and modification and we therefore desire to avail ourselves of such changes and alterations as fall within the ambit of the following claim.

We claim:

A duct leader or the like through which electric power, telephone and like cables may be led into manholes, buildings and the like, comprising a generally tubular body of composition material including a mixture of asbestos and rubber cured in situ, said body having a smooth inner surface and a roughened outer surface, said body having a generally annular lip or flange formed at one extreme end of said body and extending circumferentially around said body on the radially outer side thereof, said lip or flange being adapted to bear against the wall which defines and surrounds one end of said manhole or like opening when said duct leader is installed therein, said body, due to its rubber and asbestos content being cured in situ, being sufficiently innately resilient to tend to retain its initial size and having a slot extending from end to end therein whereby the said body may be compressed and passed into a manhole or like opening and thereafter be freed to expand and engage the roughened surface thereof with the wall of said opening to insure retention of said duct leader or the like in said opening, and said body being chamfered at the end of said slot opposite the end thereof on which said lip is formed so as to facilitate compression and insertion of said body into an opening.

WILLIAM R. DEWEY.
RAY E. SPOKES.